United States Patent Office 3,446,653
Patented May 27, 1969

3,446,653
METHOD FOR THE PRODUCTION OF SILICON
OF HIGH PURITY
Konrad Reuschel, Pretzfeld, and Norbert Schink,
Erlangen, Germany, assignors to Siemens Aktiengesellschaft, Erlangen, Germany, a corporation of Germany
No Drawing. Filed Oct. 21, 1965, Ser. No. 500,315
Claims priority, application Germany, Dec. 2, 1964,
S 94,592
Int. Cl. B44d 1/18; C23c 13/00
U.S. Cl. 117—106                                    3 Claims

ABSTRACT OF THE DISCLOSURE

Described is an improved method of purifying monocrystalline silicon growing from a silicon melt, from a gaseous phase. The improvement comprises either adding at least one of the elements titanium, zirconium, hafnium, vanadium, niobium, tantalum, molybdenum or tungsten, in an amount of not more than 1 atom percent, to the silicon melt prior to growing the monocrystalline silicon or codepositing the element together with silicon when growing from a gaseous phase.

---

Silicon of high purity is needed in large quantities for the production of semiconductor components, such as rectifiers, transistors, thyristors, etc. Various methods of silicon production and purification have become known. The most important purification methods are: pulling from a crucible and crucible-free floating zone melting. In both methods, the differences in distribution coefficients of the impurities in the semiconductor material are utilized. The solidifying monocrystal is purified, whereas the melt becomes enriched with impurities.

The content of various impurities can be held to a minimum by using hyperpure raw materials for the production of semiconductor material. According to one known method, semiconductor material is pyrolytically precipitated onto a highly heated carrier of the same material from a gaseous compound of the semiconductor material, such as silicochloroform or silicon tetrachloride, through reduction with hydrogen. If the silicon compounds and the hydrogen which are being used for this process are of very high purity, the semiconductor material thus obtained can also be very pure.

The carbon contents create certain difficulties. Commercial hyperpure semiconductor material for electrical purposes, such as silicon obtained in accordance with the above-mentioned method, usually has a carbon content of approximately $3 \times 10^{18}$ atoms/cm.$^3$. The carbon does not have a disturbing effect in the sense of a doping impurity. The carbon crystals may, however, grow during a subsequent treatment of the semiconductor materials at increased temperatures, and may thus for instance cause a disturbance during the formation of pn-junctions. For instance, during diffusion processes by which doping impurities are being injected into individual zones of the semiconductor crystal, temperatures are reached which are not very far below the melting point of the semiconductor material which for silicon is 1420° C. For instance, the indiffusion of boron, aluminum, gallium, phosphorus, arsenic or antimony into silicon is carried out at temperatures between 1200 and 1300° C. However, at these temperatures one can expect a very large growth of the carbon crystals in the silicon.

Our invention has as an object a method which overcomes these difficulties. Our invention concerns a method of producing hyperpure silicon by growing monocrystals from the melt, wherein an element of the IV, V, or VI side group of the periodic system of the elements is added, in an amount of not more than 1 atom percent, to the silicon prior to the growing of monocrystals. The addition element can be added during the process of obtaining silicon from a gaseous compound through precipitation on a heated carrier.

Elements from the IV, V, and VI side groups of the periodic system such as titanium, zirconium, hafnium, vanadium, niobium, tantalum, chromium, molybdenum and/or tungsten, form carbides of these substances with the existing carbon. The carbides of these substances, as well as the substances themselves, have a relatively small distribution coefficient in the silicon, so that a great purifying effect on these substances takes place during the process of growing monocrystals, i.e. during the pulling from the crucible or crucible-free floating zone melting.

Tantalum, tugnsten and hafnium are especially suitable, and of these tantalum is preferable. For silicon having a carbon content between 3 and $4 \times 10^{18}$ atoms/cm.$^3$, an addition from $\frac{1}{100}$ to 1% by weight of tantalum is added.

The aforementioned substances may be added in the form of gaseous compounds, preferably as halide, when producing semiconductor material from its gaseous compounds. However, the substances may also be subsequently added in elementary form, for instance during pulling from the crucible, by throwing the desired weight into the melt. In the case of crucible-free floating zone melting, the desired amount may also be applied on the semiconductor rod in elementary form, at the end of the semiconductor rod from which the melting zone begins.

The invention will be further described hereinbelow with examples which are to illustrate, but not to limit, the invention.

EXAMPLE 1

This example shows the addition of the additive, in this example tantalum, by pyrolytic coprecipitation from the gaseous phase. 1500 liters per hour of hydrogen are fed into a reaction chamber (see Schweickert et al. Patent No. 3,011,877 for details) at an absolute atmosphere (1 ata.). Within the reaction chamber are carrier rods upon which the pyrolytic is to take place. These carrier rods are heated by direct current to a depositing temperature of about 1150° C. 900 g. of silicochloroform ($SiHCl_3$) are added to the hydrogen stream to deposit 60 g. of silicon per hour.

A portion of the hydrogen current, in accord with this invention, received an addition of 5 g. of tantalum pentachloride ($TaCl_5$) per hour. Since tantalum pentachloride vaporizes at elevated temperatures, it is kept at about 300° C. to form the vapor which is entrained in the flowing hydrogen stream. In the reaction chamber, tantalum, in the amount of about 0.12 g. per hour precipitates along with the 60 g. silicon per hour.

Upon zone refining, the tantalum forms tantalum carbide with carbon present in the crystal and segregates at the impure end of the rod.

EXAMPLE 2

This example shows the addition of elementary material during the zone melting process. A tungsten wire, weighing about 1.4 g. was wound around a polycrystalline silicon rod of about 650 g. The polycrystalline semiconductor rod was crucible-free zone melted, with the tungsten wire at the end of the rod from which the melting zone begins, to convert the rod in known manner into a monocrystal. The tungsten melted into the rod, united with the carbon within the rod to form tungsten carbide and segregated at one end of the rod.

We claim:
1. In the method of producing monocrystalline hyper- pure silicon during the process of obtaining silicon by pyrolytic precipitation from a gaseous phase, the improvement which comprises depositing at least one element selected from the group consisting of titanium, zirconium, hafnium, vanadium, niobium, tantalum, chromium, molybdenum and tungsten in an amount of less than 1 atom percent together with the deposition of silicon from the gaseous phase onto a heated silicon carrier.

2. In the method of purifying monocrystalline silicon growing from a silicon melt, the improvement which comprises adding an element selected from the group consisting of titanium, zirconium, hafnium, vanadium, niobium, tantalum, chromium, molybdenum and tungsten in an amount of not more than 1 atom percent, to the silicon melt prior to growing the monocrystalline silicon.

3. In the method of purifying monocrystalline silicon growing from a silicon melt, the improvement which comprises adding from 0.01 to 1% by weight of tantalum to the silicon melt prior to growing monocrystalline silicon.

References Cited

UNITED STATES PATENTS

| 2,851,342 | 9/1958 | Bradshaw et al. | 23—301 |
| 3,129,061 | 4/1964 | Dermatis et al. | 23—223.5 |
| 3,173,765 | 3/1965 | Gobat et al. | 23—301 |
| 3,192,072 | 6/1965 | Ziegler et al. | 23—223.5 |
| 3,243,323 | 3/1966 | Corrigan et al. | 148—175 |
| 3,366,516 | 1/1968 | McAleer et al. | 148—175 X |

OTHER REFERENCES

Hartman et al.: Metal Progress, October 1956, pp. 100 to 103 relied upon.

ALFRED L. LEAVITT, *Primary Examiner.*

A. GOLIAN, *Assistant Examiner*

U.S. Cl. X.R.

23—301; 117—201

UNITED STATES PATENT OFFICE
CERTIFICATE OF CORRECTION

Patent No. 3,446,653　　　　　　　　　　　　　　May 27, 1969

Konrad Reuschel et al.

It is certified that error appears in the above identified patent and that said Letters Patent are hereby corrected as shown below:

In the heading to the printed specification, line 9, "Dec. 2, 1964" should read -- Dec. 12, 1964 --.

Signed and sealed this 21st day of April 1970.

(SEAL)
Attest:

Edward M. Fletcher, Jr.　　　　　　　　WILLIAM E. SCHUYLER, JR.
Attesting Officer　　　　　　　　　　　　　Commissioner of Patents